2,391,133

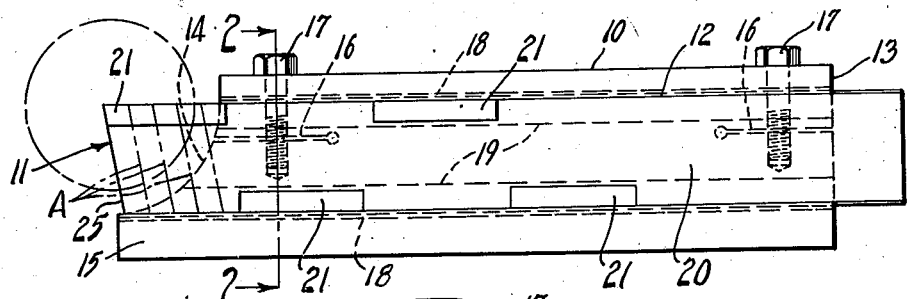
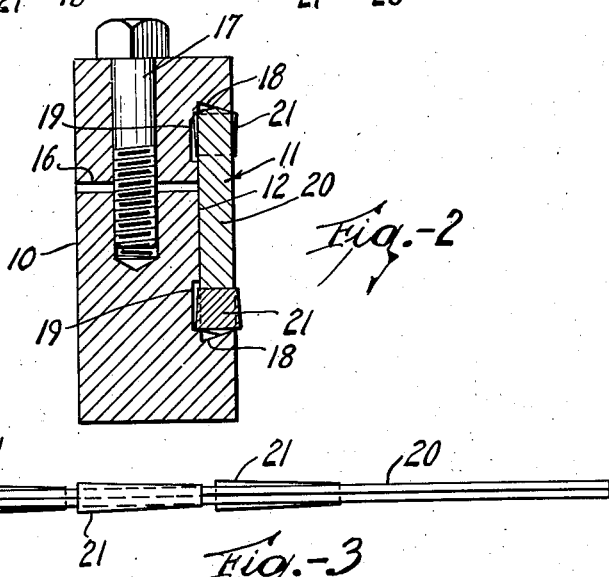
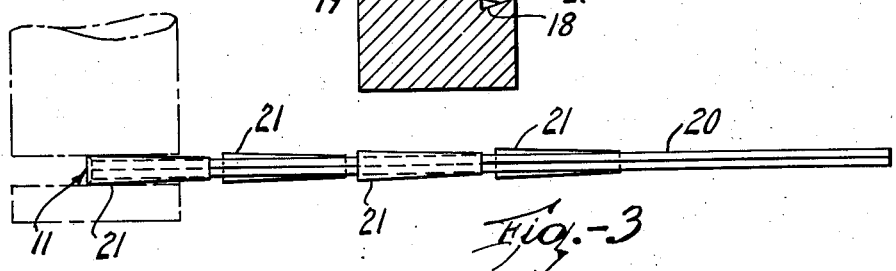
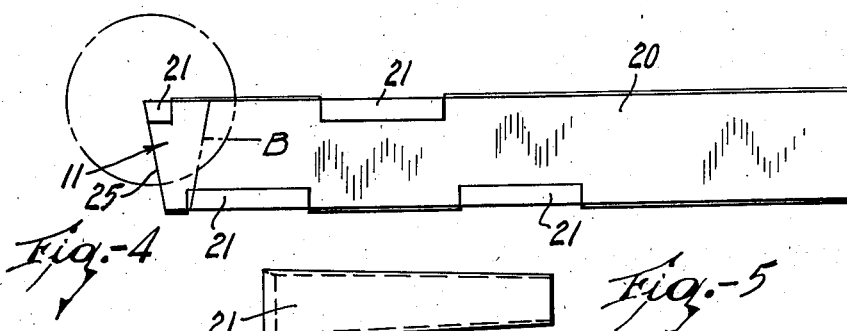
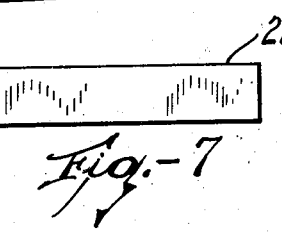
INVENTOR
GEORGE A. COLE
By Hyde and Meyer
ATTORNEYS Patented Dec. 18, 1945

UNITED STATES PATENT OFFICE 2,391,133

CUTOFF TOOL

George A. Cole, East Cleveland, Ohio

Application February 21, 1944, Serial No. 523,291

5 Claims. (Cl. 29—95)

This invention relates to metal cutting tools, and more particularly to cut-off tools, the blade of which includes a base or body of ordinary steel and one or more inserts of more expensive high speed metal.

One object of the invention is to provide an improved cut-off tool of this kind in which the cutting insert is formed to provide clearance, both vertically and fore and aft, which remains uniform until the insert is used up, but in which new cutting points or edges are provided by grinding off a single surface of the composite blade.

Still another object is to provide an improved tool having an unusually long span of life or duty, but in which the over-all cutting width is a minimum, thereby saving an otherwise considerable loss in stock wasted by wider cutting blades.

A further object is to provide a cut-off tool comprising a blade and a series of like high speed cutting inserts, each usable throughout practically its entire length, the several inserts being so located and arranged upon the blade that they may be used in turn and always without interference by following or idle inserts with the duty being performed by the leading or active inserts.

Another object is generally to improve the tool in a manner to provide solid, rigid backing for the cutting portion of the tool, avoiding vibration or chatter.

Further objects of the invention in part are obvious and in part will appear more in detail hereinafter.

In the drawing,

Fig. 1 represents a side elevation of one form of tool embodying the invention, the work being shown diagrammatically.

Fig. 2 is a sectional elevation on the line 2—2, Fig. 1;

Fig. 3 is a plan view, omitting the holder;

Fig. 4 shows the tool blade with one cutting insert nearly worn out by regrinding;

Fig. 5 is a plan view of one insert; and

Figs. 6 and 7 are end and side views thereof.

While the invention may be applied to metal cutting tools for performing any operation upon the work, it is more particularly adapted for use as a cut-off tool, the drawing showing such a cut-off tool solely for purposes of illustration and not from any standpoint of limitation of the invention.

The tool illustrated comprises a holder 10 and a blade 11 mounted therein. The tool post in which the holder is clamped or held has not been illustrated, because of conventional form.

The holder may be of any suitable or convenient form. As shown it consists of an elongated steel bar of rectangular cross section, provided along one of its vertical side faces with an elongated cavity 12 to receive the blade. The rear end of the holder is cut off square, as at 13 and its advance or front end is cut away along a curve, as at 14, to expose the leading or advance end of the blade and at the same time leave beneath its front end a projecting portion 15 to support the cutting portion of the blade as nearly as possible directly beneath the cutting edges or points. The holder is shown as slotted at its front and rear ends, as at 16, and provided with clamping bolts 17 by which the blade may be frictionally clamped in place.

The cavity or recess 12 has its upper and lower wall surfaces, marked 18, undercut to receive V-shaped edges of the blade, and it is also provided in its vertical wall surface with two open grooves 19 to receive laterally extending portions of the cutting inserts, as will later appear.

The holder 10 may be made of any ordinary strong, tough steel, such as a low carbon or inexpensive alloy steel, or any ordinary steel.

The blade 11 consists of a main or body portion 20, which also may be made of low carbon, inexpensive alloy steel, or other suitable material, and one or more inserts 21, all alike, and made of any suitable high speed steel, such as one containing tantalum, vanadium, or the like. Such steels are usually quite expensive. Each of the inserts is suitably bonded to the blade body, such as by an autogenous or other welding operation, or other suitable method of substantially permanent securement or attachment.

Since the tool is designed for cutting off purposes, it is desirable both to cut away as little of the stock or work as is possible, and also to utilize as little of the more expensive high speed steel as is possible. The present tool has been constructed with both thoughts in view.

Each insert 21 is of the form shown in Figs. 5, 6 and 7. That is to say, it is shaped to provide cutting clearance both vertically and longitudinally or fore and aft. That is to say, looking down upon one insert, as in Fig. 5, and assuming that the tool is advancing toward the left to enter the work, the insert is wider at its leading than at its trailing end. Likewise, looking at it toward its cutting end as in Fig. 7, it is wider at its top than at its bottom. The inclination of the side faces, both fore and aft and vertically is sufficient to provide approximately 1½° of clearance in an insert which, for example is of the order of an inch or an inch and a half in length. The width of each insert at its bottom (its narrowest width at any point), is substantially identical with the width of the body or plate 20, which is of uniform width throughout. Thus, when a finished blade is viewed in plan, as in Fig. 3, each of the several inserts has a portion extending laterally from the blade for the full length of the insert, an arrangement which provides cutting clearance both vertically and horizontally, throughout the length of the cutting insert, as it is ground away for resharpening purposes.

The several inserts are all made relatively short, so that the clearance angle of 1½° may be provided or preserved without unduly increasing the over-all width of the cutting blade and thus increasing the amount of stock or work removed by the cut-off operation, as would be necessary were the inserts considerably longer, such as from six to eight or more inches in length.

Further, the inserts are attached to the blade in such manner that they may be used in succession, one after another, without any liability of a trailing or following idle insert interfering with the duty being performed by the leading or active insert. For example, the inserts may be distributed only along one edge of the blade or body, which of course, would be its top edge when the blade is in use. However, to increase the available life or duty of the blade and to strengthen it vertically and give the additional support to each insert, as it becomes active, the blade has been increased in depth or vertically, and inserts have been applied to it along both its upper and lower edges. The several inserts along each edge are spaced, each from its neighbor, by a length approximately equal to the length of the insert itself, and of the same order as approximately the radius of the maximum diameter of work to be cut off, or a little more than said radius. Also, when inserts are employed along both edges of the blade, as in Fig. 1, they are spaced alternately along the upper and lower edges.

In use of the tool, the leading or cutting end of the blade is ground off at an angle, or along an inclined plane as at 25, Fig. 1, through the leading or active insert. The blade is then inserted in the holder and clamped in position. The upper and lower edges of its body 20 are of shallow V-shape in cross section and fit the undercut portions 18 of the holder recess. The laterally projecting side portions of the inserts enter the grooves 19. With the blade so clamped in the holder, the tool is inserted in the tool post and fed to the work in the manner shown in Fig. 1, which illustrates the completion of a cutting off operation and with the tool as first ground. It will be observed that the projecting portion 15 of the holder firmly supports the blade directly beneath the cutting zone and that the active cutting insert is directly above a very deep portion of the blade, so that it is rigidly supported and the tool will not chatter or vibrate. As the tool becomes dull its front or leading end is ground off along planes parallel to the plane 25, as indicated by the dotted lines A, Fig. 1, until finally so little remains of the leading insert that it is desirable to put a new one into use. Thereupon the leading portion of the tool is ground off along another plane B, diverging from the plane A, as shown in Fig. 4. This plane B intersects the second insert, which lies on the other edge of the blade. Thereupon the blade is restored to its holder but upside down from its former position. This brings the second insert into active use, and the tool is used as before, with the blade reground or resurfaced at its leading end as before until the second insert is used up. Thereupon it is ground off along another plane parallel to the plane A to expose the end of the third insert, is turned over and used again.

In this cutting-off tool a single blade, with its several cutting inserts, has a span of life considerably greater than that of the ordinary cutting insert tools used for the purpose. Moreover, each insert, throughout its entire length, provides and maintains the uniform clearance angle selected for the particular tool, such as 1½°, both vertically and fore and aft. The tool as a whole removes a minimum amount of stock and the regrinding operation is a simple one on the end surface of the blade alone. Ample support is provided for the cutting portion of the tool. Finally the tool utilizes a minimum amount of the more expensive high speed cutting steel. Other advantages of the invention will be apparent to those skilled in the art.

What I claim is:

1. A cutting tool of the character described, comprising a supporting blade of ordinary steel of bar form having a cross section which is narrow and deep and is uniform from end to end of the blade, the upper edge of said blade being notched crosswise to provide a through recess, and a high speed cutting member mounted in said recess and permanently bonded to the blade, said cutting member having a length approximating the depth of the blade and throughout its length and depth extending outwardly from a side face of the blade, said member also being gradually tapered both rearwardly and downwardly and at its narrowest point having a width at least equal to that of the blade, thereby providing cutting clearance both rearwardly and downwardly throughout the length of the cutting member as the tool repeatedly is resharpened by grinding back its leading end face.

2. A cutting tool of the character described, comprising a supporting blade of ordinary steel of bar form having a cross section which is narrow and deep and is uniform from end to end of the blade, and a plurality of high speed cutting elements spaced along the upper edge of the blade and permanently bonded to said blade, each of said elements decreasing gradually in width both rearwardly and downwardly, the blade having a width not greater than the narrowest portion of the cutting elements, thereby to provide cutting clearance throughout the length of each cutting member as the tool repeatedly is resharpened by grinding back its leading end face.

3. A cutting tool of the character described, comprising a supporting blade of ordinary steel of bar form having a cross section which is narrow and deep and is uniform from end to end of the blade, and a series of cutting elements spaced along the upper and lower edges of said blade in two rows in alternating order, each element of each row being opposite a space between two adjoining elements of the other row, said elements being made of high speed cutting steel and each thereof being tapered to provide cutting clearance both rearwardly and downwardly throughout the length of the cutting element as the tool is redressed by alternating use of successive cutting elements along the two edges of the blade and during use of each element is repeatedly resharpened by grinding back its leading end face.

4. A cutting tool of the character described, comprising a supporting blade of ordinary steel of bar form having a cross section which is narrow and deep and is uniform from end to end of the blade, and a series of cutting elements spaced along the upper and lower edges of said blade in two rows in alternating order, each element of each row being opposite a space between two adjoining elements of the other row, said elements being made of high speed cutting steel and each thereof having a length approximating the depth of the blade and throughout its length and depth extending outwardly from both side faces of the blade and being tapered horizontally and vertically to provide cutting clearance on both side faces both rearwardly and downwardly throughout the length of each cutting element.

5. A cutting tool of the character described, comprising a supporting blade of ordinary steel of bar form having a cross section which is narrow and deep and is uniform from end to end of the blade, and a series of cutting elements spaced along the upper and lower edges of said blade in two rows in alternating order, each element of each row being opposite a space between two adjoining elements of the other row, and said elements being made of high speed cutting steel and extending beyond both side faces of the blade and being tapered horizontally and vertically to provide cutting clearance on both side faces of the blade both rearwardly and downwardly throughout their length, the lengths and spacing apart of the several cutting elements of each series being of the order of the maximum radius of the work to be cut.

GEORGE A. COLE.